Sept. 25, 1934.    J. R. REYBURN    1,974,833
ADJUSTING AND TIGHTENING DEVICE FOR TIRE CHAINS
Original Filed Dec. 18, 1930    2 Sheets—Sheet 1
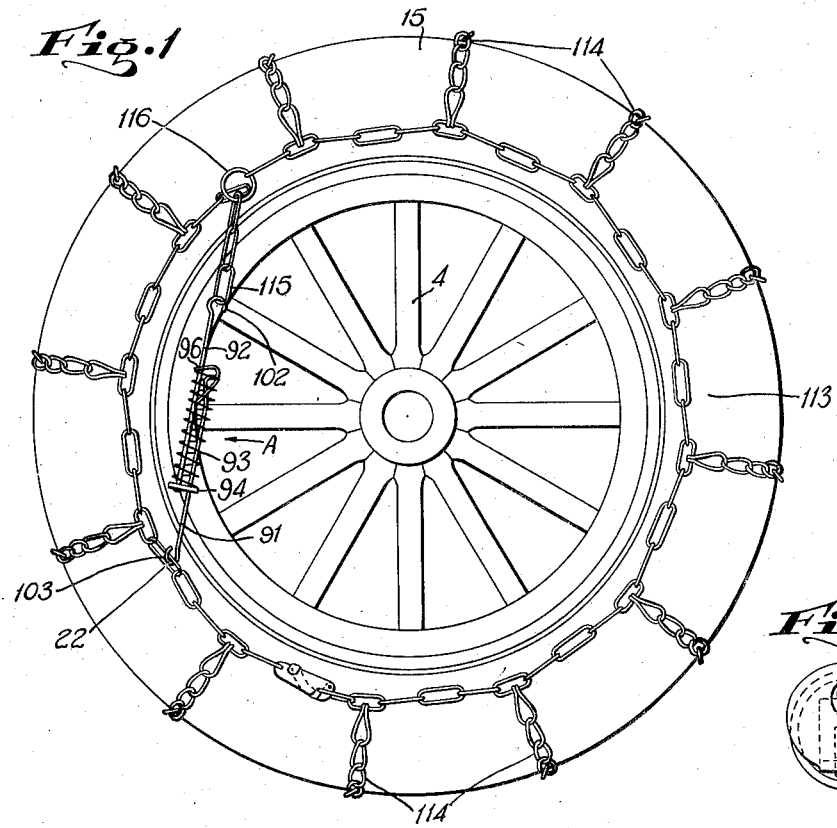
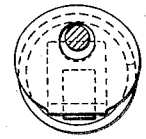
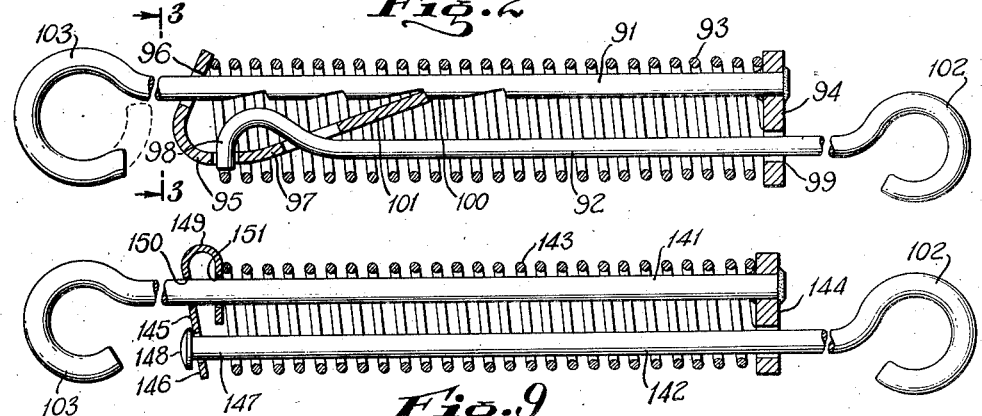
INVENTOR.
JOHN R. REYBURN
BY
ATTORNEY.

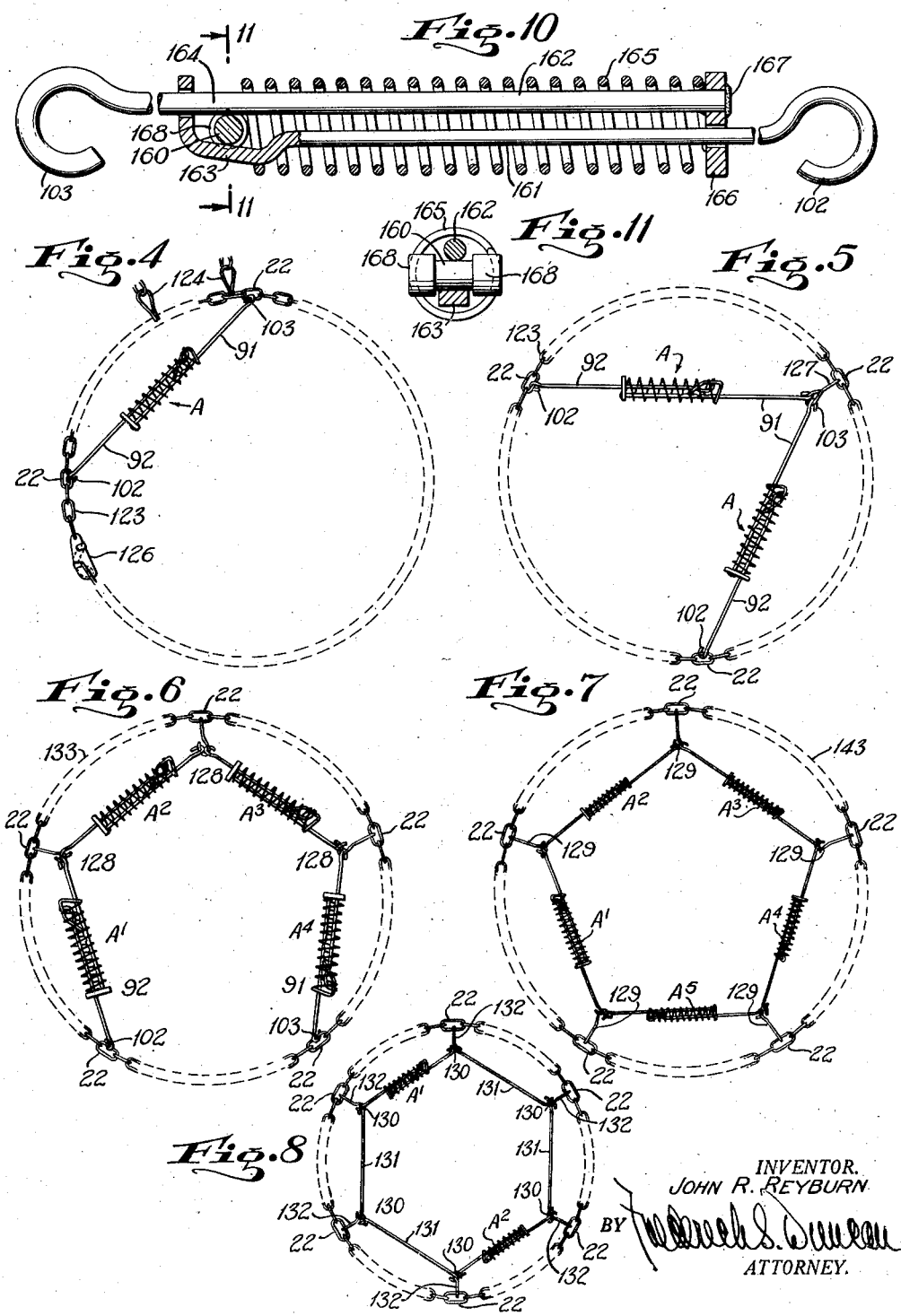

Patented Sept. 25, 1934

1,974,833

UNITED STATES PATENT OFFICE 1,974,833

ADJUSTING AND TIGHTENING DEVICE FOR TIRE CHAINS

John R. Reyburn, Fairfield, Conn., assignor to American Chain Company, Inc., a corporation of New York Original application December 18, 1930, Serial No. 503,187. Divided and this application November 15, 1932, Serial No. 642,707

5 Claims. (Cl. 152—14)

This invention relates to anti-skid chains for automobile tires, and more specifically to devices for adjusting tire-chains automatically upon the tires and maintaining them in uniformly draped, snugly fitting position thereon after their initial emplacement by the user.

This application is a division of my co-pending application Serial No. 503,187, filed December 18, 1930.

The average user of a tire-chain usually places the chain upon the tire rather loosely, whether from lack of the skill necessary to accomplish a proper fitting of the chain, or from haste, or carelessness, or ignorance as to the desirability of having the chain uniformly draped, in order to secure its maximum efficiency in operation. By uniform draping of a tire chain its period of usefulness may be tripled, for a loose chain will break after relatively short use with the car running at a given speed, as compared with the performance of a uniformly draped chain.

Even when using more than average skill, moreover, it is difficult to accomplish the draping with a desirable degree of uniformity, by a single manual operation, and accordingly, to avoid repeated manual adjusting operations, use is made commonly of adjusting devices acting automatically to draw the tire chain taut upon the tire.

Conventional chain adjusting devices, of the type which depend upon the tension of a spring or springs to take up the slack of the chain, permit slack to occur under the centrifugal force which develops at speeds upwards of 25 miles per hour, and at 30 miles an hour the spring effect completely disappears so far as any useful purpose is served.

If the springs be very strong, they tend to make the chains bite into the tire, and so prevent the creeping which is an essential characteristic of a properly fitted tire chain.

Various forms of devices have been proposed for taking up the slack of tire chains by means of a spring, or springs, and for holding the draped chain positively to prevent further development of slack, but such devices have failed to come into general use, because of undue complexity or expense, or on account of their unreliability in service, or lack of a sufficient degree of sensitiveness in action.

The general object of the present invention is to provide a tire chain with an adjusting device or system of devices which may, and preferably will, form an element of the tire chain and which will act automatically, immediately upon the start of the car, to take up the slack and drape the tire chain uniformly upon the tire before the car reaches a speed of say forty miles an hour, and will thereafter maintain the tire chain in such snug position as to obtain effective service of the tire chain for its maximum mileage, whatever the speed of the car.

Among more particular objects of the invention is the provision of an automatically acting device or system of such devices which operates to take up the slack in successive step-by-step operations acting in the same direction, each device being so constructed as to prevent positively any retrograde movements of the parts in the opposite direction, the aggregate tightening effect extending over a range of several inches.

Still another object of the invention is to provide such an adjusting device with a considerable take-up range, and so constructed that during the first part of the take-up the spring acts under its maximum compression, to reduce the slack very rapidly, and then acts, step by step, under lower compression to take up more gradually the remaining slack and effect the uniform draping of the chain, after which the device acts under still lower compression to exert a tension which is insufficient to cause the cross chains to bite into the tire enough to prevent the tire chain from creeping on the tire.

The above, and other features of the invention are illustrated and described fully in the accompanying drawings and specification, and are pointed out in the claims.

In the drawings;

Figure 1 is a view in side elevation of a vehicle wheel provided with a tire chain having an adjusting device thereon;

Fig. 2 is a longitudinal sectional view, with parts shown in elevation of the adjusting device shown in Fig. 1;

Fig. 3 is a view in section taken on the line 3—3 of Fig. 2;

Figs. 4 to 8 inclusive are views of a somewhat diagrammatic character, illustrating different modes of applying an adjusting device of the character shown in Fig. 2;

Fig. 9 is a view similar to Fig. 2 showing another form of adjusting device;

Fig. 10 is a similar view showing still another form of adjusting device; and

Fig. 11 is a vertical sectional view taken on the line 11—11 of Fig. 10.

In Fig. 1 is shown a wheel 4 bearing a tire 15 on which is draped a tire chain having side chains 113 and cross-chains 114. The side chain, as shown, is long enough to provide for passing one end 115 thereof through a ring or link 116 at the other end of the side chain. An adjusting device A is hooked at one end thereof into one of the links of the part 115 and at the other end into a link 22 of the side chain at a region suitably remote from the link or ring 116. The adjusting device A may be of any of the forms shown in Figs. 2, 9, or 10 of the present application or Figs. 9 and 15 of said copending application.

The preferred form shown in Figs. 2 and 3 comprises a pair of sliding members 91 and 92, surrounded by a coiled spring 93 held under compression between an abutment 94, riveted on the member 91, and a detent or pawl member 95, provided with an apertured portion 96 to fit slidingly on, and to have a rocking movement about, the member 91.

This pawl has a body portion 97, apertured for connection with a hook portion 98 formed at the left-hand end of the member 92, the right-hand end of the latter member having a bearing at 99 in the abutment 94.

The member 91 is serrated at 100, and the pawl 95 has its free end 101 bent into position to serve as a detent, engaging progressively with the teeth 100 as the member 91 and 92 slide toward their co-extensive or contracted position, substantially in the manner described with respect to the forms of adjusting device already referred to in this specification.

The members 91 and 92 are respectively provided with hooks or eyes 102 and 103, for connection with parts of a side chain, or any suitable element of a tire chain, and when so connected, with the spring 93 initially placed under compression by extension of the members 91 and 92 relatively to each other, the expansion of the spring against the portion 96 of the pawl, and the drag of the hook 98 upon the part 97 of the pawl, both tend to urge the detent 101 into engagement with the serrated portion 100 of the member 91.

In Fig. 1 the hook or eye 103 of the member 91 is connected with one of the links 22 and the hook 102 of the member 92 with the free end of the part 115. The tire chain, thus provided with an adjusting device A, will be uniformly draped upon the tire by the action of the device A after a few turns of the wheel in use, the device A acting automatically to take up the slack and prevent further development of slack.

In Fig. 4 is illustrated a modified application of the adjusting device A to a side chain 123, the tire chain shown being of a conventional type having cross chains 124 connected with the side chain, and the latter having an ordinary connecting hook 126.

The adjusting device A is here shown as having the hooks 102 and 103 at the ends of its sliding members 91 and 92 connected with links 22 in the side chain spaced about 120° apart. The adjusting device may be applied to the tire chain prior to sale thereof, and the hooks closed to form eyes, or the device may be sold as a separate article and then be applied by the purchaser to an existing chain, either permanently or temporarily, as desired.

In Fig. 5, another modification is illustrated in which two adjusting devices of the A type are shown applied to a tire chain 123 of the same conventional form as that described with reference to Fig. 4, each of the devices A having the end hook 102 on its member 92 connected with a link 22 of the side chain 123 at a distance of about 120° from each other, while the eyes 103 on the other members 91 of the devices are joined by a connecting member 127 which is hooked into a side chain link 22 equidistant from the links 22 to which the hooks 102 are connected.

This triangular application of the adjusting forces provides for a more uniformly distributed and efficient draping of the tire chain, and the system of adjusting devices thus constituted may be associated permanently with the tire chain, prior to sale thereof, or may be applied to existing chains either permanently or temporarily.

In Fig. 6, four of the type A adjusting devices are illustrated in a system applied to a conventional tire chain 133, being connected at five points to links 22 at approximately equal distances apart in the side chain, the hook 102 of one member 92 of device A', and the hook 103 of member 91 of device $A^4$ being connected to side chain links about 72° apart, while the devices A', $A^2$, $A^3$, and $A^4$ are connected in series each to the adjacent device by connecting members 128, each of which is in turn connected to a link 22 of the side chain, the system being substantially pentagonal in arrangement. This also is a more efficient mode of application to secure uniformity of draping and sensitiveness in operation, than the triangular application.

A similar pentagonal arrangement is illustrated in Fig. 7, but in this instance five A-type devices are shown, connected together by connecting members 129, each of which is in turn connected with a link 22 of a side chain 143 of conventional form. This arrangement has all of the advantages of the arrangement shown in Fig. 6 and may be used where the character of the service warrants the provision of the extra device.

In the modification illustrated in Fig. 8, a hexagonal system of connecting members 130 is applied to links 22 at intervals of about 60°, and two A-type adjusting devices are provided, at diametrically opposite regions of the system, each device acting on two adjacent connecting members 130, from which the adjusting force is distributed to the other connecting members by links 131, which may be either rods or cables.

If cables be used, a single cable may be employed at each side of the system, running freely through the eyes 132 of two of the connecting members at each side of the system. This affords a very flexible embodiment of the invention, and has the advantage of requiring only two adjusting devices.

Other modifications in the application of the adjusting devices may be adopted, embodying the invention, and it will be understood that while the device of Fig. 2 has been selected for illustration in the different arrangements shown, this is only by way of example, and any other embodiment of the invention may be employed.

For example, adjusting devices having pairs of elongated sliding members, with an actuating coiled spring, may be provided with different forms of locking means, two such different forms being shown in Figs. 9 and 10.

In the modification illustrated in Fig. 9, the sliding members 141 and 142 with their actuating spring 143 and abutment part 144, are the same in general structure and arrangement as similar parts shown in Fig. 2. The locking effect, however, is produced by a detent 145 comprising a separately formed member of resilient sheet metal bent upon itself to form an attachment portion 146, apertured to receive the end 147 of the member 142 which has a head 148 to hold the detent thereon, and the detent has a portion 149 of inverted U-shape, apertured at 150 and 151 to fit loosely upon the member 141.

The spring 143 is confined under compression between the abutment part 144 at one end, and the portion 151 of the detent at its other end, these parts being so constructed and arranged that under the expansive action of the spring, the members are urged toward their co-extensive position shown in Fig. 9, the detent sliding freely along the member 141 and drawing the member 142 with it by engagement of the part 146 with the head 148.

Any retrograde, extending movement of the members 141 and 142, relatively to each other, is opposed by the tendency of the detent to tilt and frictionally bite the member 141, this tilting action resulting from the pushing action of the spring against the detent part 151, and the pull of the head 138 against the detent part 146.

If the hooks or eyes 102 and 103 at the ends of the members 141 and 142 be connected with the ends of a side chain, or with any suitable parts of a tire chain, as in any of the applications already described, or by other suitable modes of employment, the device will tend to take up the slack and drape the tire chain uniformly, and will hold it in place and prevent the development of slack thereafter.

The biting action of the detent may be overcome by manual pressure against the part 149 when it is desired to extend the device for application of the tire chain to a tire.

In the modification illustrated in Fig. 10, a form of locking device is shown which comprises a roller 160 working between an inclined portion 163 of a member 161 and the opposed part 164 of a co-operating sliding member 162, its action being to oppose extension of the members relatively to each other while permitting relative sliding movement of the members toward their co-extensive position shown in Fig. 10, under the expansive action of the coiled spring 165, the latter being held under compression between an abutment 166, riveted at 167 upon the member 162, and shoulders 168 (see Fig. 11) with which the roller 160 is provided. These shoulders furnish means by which the roller may be grasped to release the locking action when it is desired to extend the device for the purpose of applying, to a tire, the tire chain in which the device is embodied.

Hooks or eyes 102 and 103 are provided as means to connect the device with links of a side chain or other suitable tire chain part, as already described with respect to the other forms of adjusting devices illustrated herein.

I claim:

1. An adjusting and tightening device for tire chains, said device comprising a plurality of elongated members assembled in parallel sliding relation and provided with a coiled spring acting at its ends respectively upon spaced portions of said sliding members and tending normally to urge said members into a co-extensive position relatively to each other, one of said members having a series of teeth, said device comprising also a pawl having an apertured portion fitted to slide and rock upon said toothed member and an angularly disposed detent portion adapted to be engaged successively with said teeth, said pawl having an intermediate body portion connected loosely with a hook formed on one end of the other sliding member, and said spring being engaged at one of its ends with said apertured portion of said pawl, whereby the expansive action of the spring is communicated to said last mentioned sliding member and whereby the spring is compressed by extension of the sliding members relatively to each other, said spring tending also to urge said detent portion of said pawl into engagement with said teeth thereby to prevent relative extension of said members at various regions of their sliding relationship.

2. An adjusting and tightening device for tire chains, said device comprising a plurality of elongated members assembled in parallel sliding relation and provided with a coiled spring acting at its ends respectively upon spaced portions of said sliding members and tending normally to urge said members into a co-extensive position relatively to each other said device comprising also a U-shaped detent with legs of unequal length, both of said legs being transfixed by one of said sliding members, upon which said detent is adapted to slide freely during relative sliding movement of said members toward their co-extensive position, and the longer leg of said detent being engaged loosely with the other sliding member, whereby the detent is normally rocked into biting engagement with the transfixing member when a draft is exerted tending to extend said device, said spring being engaged with the transfixed portion of said detent and acting thereby to cause said relative sliding movement of said members toward their co-extensive position, and acting also to promote said rocking movement of said detent into biting position upon retrograde, extending, movements of said members relatively to each other.

3. An adjusting and tightening device for tire chains, said device comprising a plurality of elongated members assembled in parallel sliding relation and provided with a coiled spring acting at its ends respectively upon spaced portions of said sliding members and tending normally to urge said members into a co-extensive position relatively to each other, said device comprising also a locking device characterized by a roller embraced between said sliding members, one of said sliding members having an inclined portion serving as a cam adapted to urge said roller into wedging relation with said other member upon any relative extending movement of said members, but permitting free relative movements of said members toward their co-extensive position, and said roller being engaged by one end of said spring, whereby the expanding action of said spring is communicated to the member having said cam portion for the purpose of causing said movements toward co-extensive position, and whereby said spring also acts to promote said biting action in the reverse direction.

4. A device of the character described, comprising a pair of elongated members assembled in parallel sliding relation, a one-way detent normally bearing oppositely against said members respectively to prevent relative extension of the members, and a compression spring separate from but bearing at one end against the detent and at the other end against one of the members, thereby pressing the detent into normal operative position and at the same time urging the members toward coextensive position.

5. A device of the character described, comprising a pair of elongated members assembled in parallel sliding relation, a pawl carried by one of the members and normally bearing against the other member in a direction to prevent relative extension of the members but permit movement of the members toward coextensive position, a compression spring separate from but bearing at one end against the pawl and at the other end against said other member, thereby pressing the pawl against said other member and at the same time urging the members toward coextensive position.

JOHN R. REYBURN.